US012441259B2

(12) United States Patent
Brillon et al.

(10) Patent No.: US 12,441,259 B2
(45) Date of Patent: Oct. 14, 2025

(54) METHOD FOR LOCATING A USER DEVICE IN A SUB-ZONE OF A MAIN ZONE DEFINED WITH RESPECT TO A VEHICLE

(71) Applicant: Continental Automotive GmbH, Hannover (DE)

(72) Inventors: Alain Brillon, Toulouse (FR); Patrick Belenguer, Toulouse (FR); Stéphane Charbonnier, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 354 days.

(21) Appl. No.: 18/078,386

(22) Filed: Dec. 9, 2022

(65) Prior Publication Data

US 2023/0182663 A1    Jun. 15, 2023

(30) Foreign Application Priority Data

Dec. 10, 2021    (FR) ........................................ 2113261

(51) Int. Cl.
*B60R 16/037*    (2006.01)
*H04W 4/02*    (2018.01)

(52) U.S. Cl.
CPC ........... *B60R 16/037* (2013.01); *H04W 4/025* (2013.01)

(58) Field of Classification Search
CPC ..... B60R 16/037; B60R 16/023; H04W 4/025
USPC .................................................... 455/456.1
See application file for complete search history.

(56) References Cited

U.S. PATENT DOCUMENTS

| 8,768,539 | B1 | 7/2014 | Clement et al. | |
|---|---|---|---|---|
| 2002/0090952 | A1* | 7/2002 | Cantwell | H04W 64/00 342/451 |
| 2004/0087316 | A1* | 5/2004 | Caci | G01S 5/02213 342/465 |
| 2015/0161834 | A1 | 6/2015 | Spahl et al. | |
| 2015/0208207 | A1* | 7/2015 | Ye | H04W 4/023 455/456.1 |
| 2016/0182548 | A1* | 6/2016 | Ghabra | H04W 24/10 726/23 |
| 2017/0208438 | A1* | 7/2017 | Dickow | H04W 4/40 |

(Continued)

FOREIGN PATENT DOCUMENTS

| CN | 104703129 A | 6/2015 |
|---|---|---|
| CN | 113225681 A | 8/2021 |

(Continued)

OTHER PUBLICATIONS

French Search Report for French Application No. 2113261, dated Jul. 8, 2022 with translation, 11 pages.

(Continued)

*Primary Examiner* — Qutbuddin Ghulamali
(74) *Attorney, Agent, or Firm* — Buchanan Ingersoll & Rooney PC (57) ABSTRACT

A method for locating a user device in a sub-zone of a main zone defined with respect to a vehicle, especially including detecting the user device in a first sub-zone, locating the user device in the first sub-zone, keeping locating the user device in the first sub-zone for as long as the user device is detected in the first sub-zone, detecting the user device in a second sub-zone, and locating the user device in the second sub-zone when the user device is detected solely in the second sub-zone.

10 Claims, 12 Drawing Sheets

(56) References Cited

U.S. PATENT DOCUMENTS

| | | |
|---|---|---|
| 2017/0347238 A1 | 11/2017 | Menouar |
| 2019/0300006 A1 | 10/2019 | Golsch |
| 2020/0010050 A1 | 1/2020 | Spick et al. |
| 2020/0186970 A1* | 6/2020 | Dekovich ............... H04W 4/40 |
| 2021/0221330 A1 | 7/2021 | Boudet et al. |
| 2021/0379990 A1 | 12/2021 | Tucci et al. |

FOREIGN PATENT DOCUMENTS

| | | |
|---|---|---|
| CN | 113752826 A | 12/2021 |
| WO | 2017110543 A1 | 6/2017 |

OTHER PUBLICATIONS

Office Action (First Office Action) issued Mar. 20, 2025, by the National Intellectual Property Administration, P. R. China in corresponding Chinese Patent Application No. 202211577063.4 and an English translation of the Office Action. (15 pages).

* cited by examiner

METHOD FOR LOCATING A USER DEVICE IN A SUB-ZONE OF A MAIN ZONE DEFINED WITH RESPECT TO A VEHICLE

CROSS REFERENCE TO RELATED APPLICATIONS

This application claims priority to French Patent Application No. 2113261, filed Dec. 10, 2021, the contents of such applications being incorporated by reference herein.

FIELD OF THE INVENTION

The present invention relates to the automotive field and more particularly regards a method for locating a user device with respect to a vehicle.

BACKGROUND OF THE INVENTION

In a motor vehicle, it is known practice to determine the position of a user device, a tag or a smartphone for example, outside of the vehicle, in order to permit the user-welcome function to be activated, or indeed inside the vehicle, in order to permit driving systems to be activated and the engine started.

In a known manner, this position is determined based on transceivers mounted in the vehicle, on the bodywork or in the passenger compartment, that for example are six or eight in number. To this end, the user device first transmits a poll message in what is referred to as polling mode. Next, on reception, each transceiver responds by transmitting a request signal comprising its identifier to the user device, which responds to each transceiver by sending a dedicated response signal comprising the identifier of said transceiver. In general, the transceivers each send their request signal in turn, and hence the user device also sends its response signals to each thereof in turn.

On receiving the response signal comprising its identifier, each transceiver calculates the total time of flight of the request signal and of the response signal or else determines the power of the received response signal, in order to determine the distance between said transceiver and the user device. An electronic control unit aboard the vehicle then uses the distances calculated by each transceiver to estimate the position of the user device, for example via triangulation or any other suitable method.

In the majority of existing solutions, the signals are transmitted in a low-frequency or LF band below 300 kHz, or else at radio or RF frequencies of about 433 MHz. At these frequencies, the signals rebound little from objects, with the exception for example of large metal objects, and especially pass through the human body. Thus, the request and response signals are deflected little.

However, as the automotive industry adopts new technologies as they are developed, one of the current tendencies is to use signals in higher frequency bands, and especially in the ultra-wide band (UWB) between 6 GHz and 10 GHz, in order to improve location accuracy and thus to make it possible to trigger more functions, and functions that are more personalized.

These high-frequency signals are reflected more easily by objects and the human body. A reflected signal will follow a longer path, causing error in the distance calculation and therefore in the location of the user device, this being a major drawback in the case where the user device is detected to be located outside of a zone in which it must be found to trigger certain functions such as, for example, functions welcoming the user of the vehicle, and especially between two zones, no functions being triggered as a result, whereas in fact it is in one of these zones, or indeed when it is detected to be located in both zones at the same time, the vehicle then not being capable of determining which functions it must activate.

Therefore, there is a need for a solution allowing these drawbacks to be at least partially overcome.

SUMMARY OF THE INVENTION

To this end, a first aspect of the invention is a method for locating a user device in a sub-zone of a main zone defined with respect to a vehicle, said vehicle comprising a plurality of transceivers and an electronic control unit that is configured to determine the position of the user device based on signals sent by the user device and received by the transceivers, said method comprising steps, implemented by the vehicle, of:
  a. periodically determining the position of the user device based on signals sent by the user device and received by the transceivers,
  b. detecting the user device in a first sub-zone,
  c. locating the user device in said first sub-zone,
  d. keeping locating the user device in the first sub-zone for as long as the user device is detected in said first sub-zone,
  e. detecting the user device in a second sub-zone,
  f. locating the user device in said second sub-zone when the user device is detected solely in said second sub-zone.

By the term "detecting", what is meant is determining the position of the user equipment in one of the sub-zones. The sub-zones may be separate or partially superposed. By the term "locating", what is meant is determining the status of the user equipment in respect of its position in a sub-zone or in the main zone.

The method according to an aspect of the invention allows the user device to be located in one of the sub-zones, in order to prevent the location from switching to a sub-zone in which the user device is not or from ping-ponging between two sub-zones. Thus, when the position of the user device is erroneous or indeterminable, for example when one of the locating signals is reflected from an obstacle and modified, the position of the user device is kept in the sub-zone in which it was beforehand.

According to one aspect of the invention, the user device is detected to be located outside of any sub-zone when it is detected in one of the sub-zones but outside of the main zone.

Preferably, location of the user device in the first sub-zone causes at least a first function of the vehicle to be triggered.

Also preferably, location of the user device in the second sub-zone causes at least a second function of the vehicle to be triggered.

In one embodiment, the main zone corresponds to the passenger compartment of the vehicle and the sub-zones correspond to different seats of the passenger compartment.

In another embodiment, the main zone corresponds to a peripheral zone situated around the vehicle, and preferably to a peripheral zone that conforms to the exterior contours of the vehicle.

In this case, the sub-zones may advantageously serve to locate the user of the user device in the context of providing parking assistance or of personalizing welcome depending on the place in which he is found around the vehicle.

An aspect of the invention also relates to a computer program product characterized in that it comprises a set of program code instructions that, when executed by one or more processors, configure the one or more processors to implement a method such as presented above.

An aspect of the invention also relates to an electronic control module for a motor vehicle, said vehicle comprising a plurality of transceivers, said electronic control module being configured to:
  a. —periodically determine the position of the user device based on signals sent by the user device and received by the transceivers,
  b. —detect the user device in a first sub-zone,
  c. —locate the user device in said first sub-zone,
  d. —keep locating the user device in the first sub-zone for as long as the user device is detected in said first sub-zone,
  e. —detect the user device in a second sub-zone,
  f. —locate the user device in said second sub-zone when the user device is detected solely in the second sub-zone.

An aspect of the invention also relates to a motor vehicle comprising a plurality of transceivers and an electronic control unit such as presented above.

An aspect of the invention also relates to a system comprising a vehicle such as presented above and a user device, said user device being configured to:
  a. transmit, for example periodically, a request signal,
  b. receive response signals sent by the transceivers one after the other,
  c. transmit a location signal to each transceiver, said location signal comprising the identifier of said transceiver.

BRIEF DESCRIPTION OF THE DRAWINGS

Other features and advantages of aspects of the invention will become more clearly apparent on reading the following description. This description is purely illustrative and should be read with reference to the appended drawings, in which.

DETAILED DESCRIPTION OF THE PREFERRED EMBODIMENTS

Figure 1:
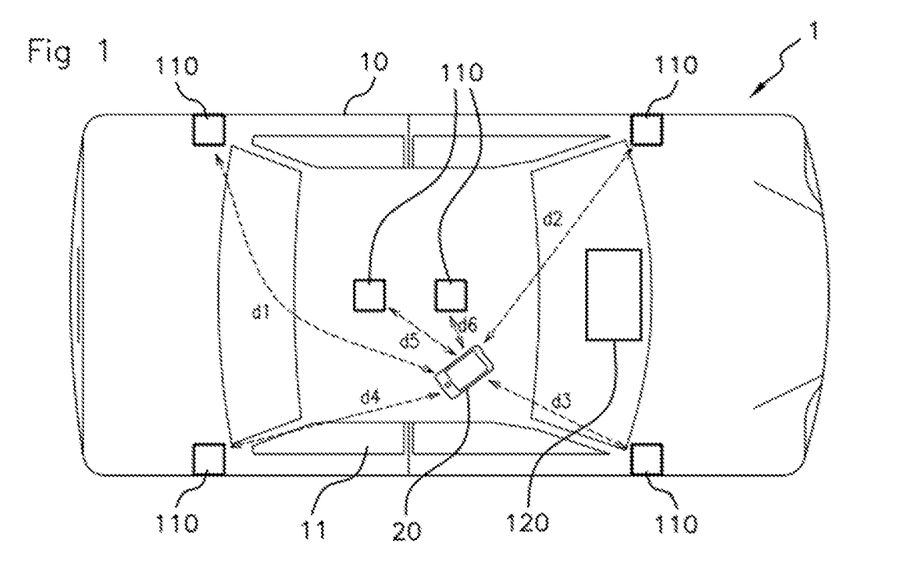
FIG. 1 schematically shows one embodiment of the system according to the invention.

FIG. 1 shows one example of a system 1 according to an aspect of the invention.

System 1

The system 1 comprises a vehicle 10 and a user device 20.

Vehicle 10

The vehicle 10 comprises a plurality of transceivers 110 and an electronic control unit 120. In this example, the vehicle 10 comprises six transceivers 110: four external transceivers 110 mounted outside the passenger compartment 11, for example on or in the bodywork, and two internal transceivers 110 mounted in the passenger compartment 11, this not limiting the scope of the present invention. Specifically, in another embodiment, the vehicle 10 could comprise more or fewer than six transceivers 110, but preferably at least three transceivers in order to allow the position of the user device 20 to be determined via triangulation.

In order to implement an aspect of the invention, a main zone is defined in and/or around the vehicle 10. This main zone ZP is associated with a plurality of sub-zones SZ1, . . . SZn, where n is a natural integer.

Transceiver 110

Each transceiver 110 is configured to transmit a request signal SREQ to the user device 20 on command by the electronic control unit 120, said request signal SREQ comprising the identifier of said transceiver 110.

Each transceiver 110 is configured to receive response signals SREP transmitted by the user device 20 in response to the request signal SREQ, each response signal comprising the identifier of the user device 20 and the identifier of said transceiver 110.

Each transceiver 110 is configured to transmit the received response signals SREP to the electronic control unit 120.

Preferably, each transceiver 110 is configured to transmit and receive the signals in a UWB frequency band comprised between 6 and 10 GHz (UWB being the acronym of ultra-wide band).

Electronic Control Unit 120

The electronic control unit 120 is configured to control transmission, by each transceiver 110, of a request signal SREQ to the user device 20, said request signal SREQ comprising the identifier of the transceiver 110 transmitting it.

The electronic control unit 120 is configured to calculate the distance (d1 . . . d6) of the user device 20 in relation to each of the transceivers 110 based on response signals SREP transmitted by the user device 20 and received by each transceiver 110, each response signal comprising the identifier of the user device 20 and the identifier of said transceiver 110.

The electronic control unit 120 is configured to calculate the position of the user device 20 based on the received response signals. The position of the user device 20 may be determined by the electronic control unit 120 using the time of flight of the request and response signals SREQ, SREP or the power of the response signals SREP in a way known per se, and for example via triangulation, through use of a neural network, or any other suitable known method.

The electronic control unit 120 is configured to detect the user device in a first sub-zone of the main zone.

The electronic control unit 120 is configured to locate the user device in said first sub-zone.

The electronic control unit 120 is configured to keep locating the user device in the first sub-zone for as long as the user device is detected in said first sub-zone.

The electronic control unit 120 is configured to detect the user device in a second sub-zone of the main zone.

The electronic control unit 120 is configured to locate the user device in said second sub-zone when the user device is detected solely in said second sub-zone.

The electronic control unit 120 comprises a processor (not shown) that is able to implement an instruction set allowing these functions to be performed.

Examples of Implementation

Figure 6:
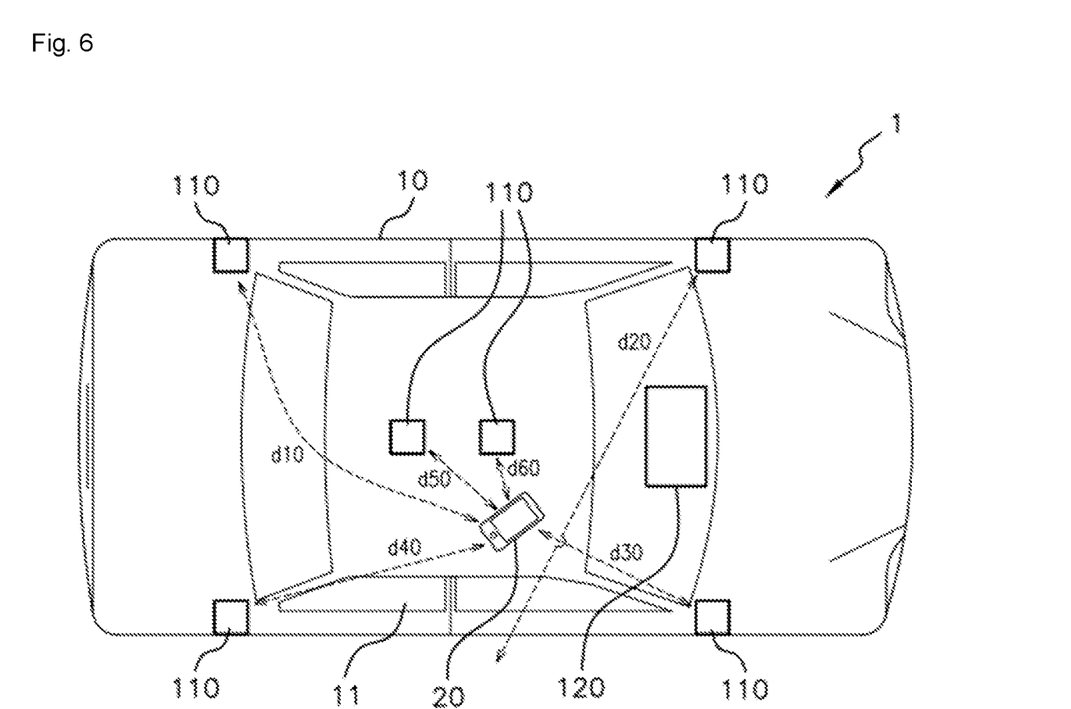
FIG. 6 schematically shows the system on determination of an erroneous distance for one of the transceivers.
Figure 7:
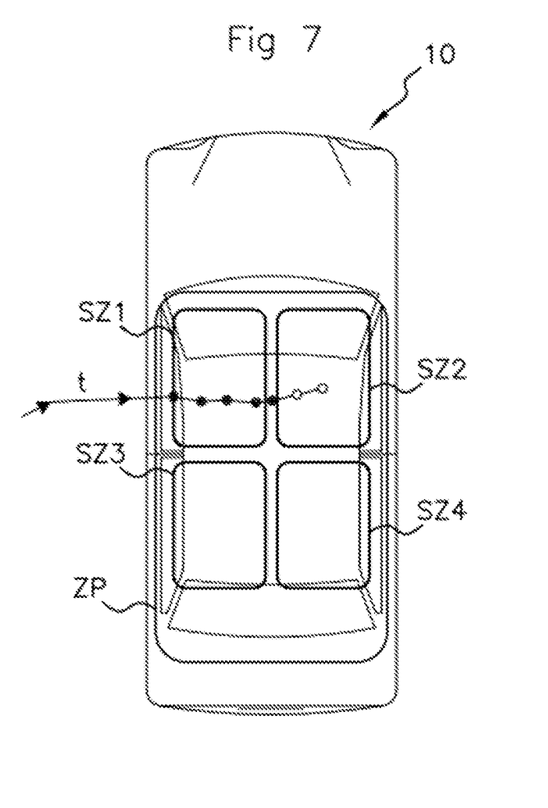
FIG. 7 schematically shows a first example of a main zone and of sub-zones.
Figure 8:
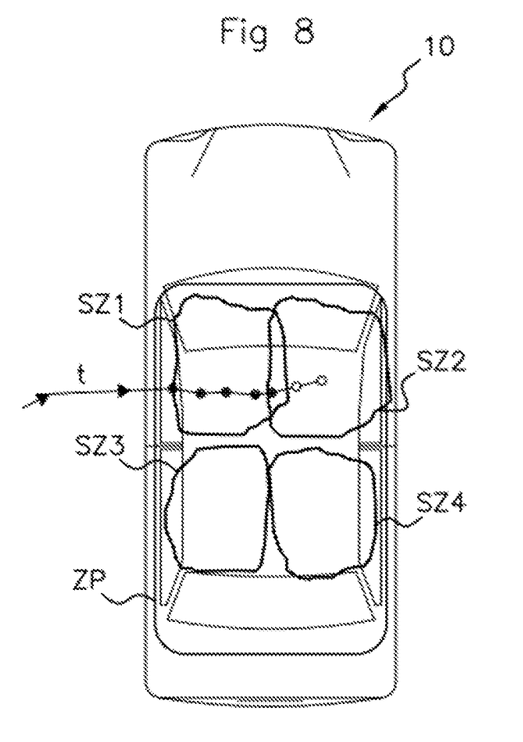
FIG. 8 schematically shows one variant of FIG. 7.
Figure 9:
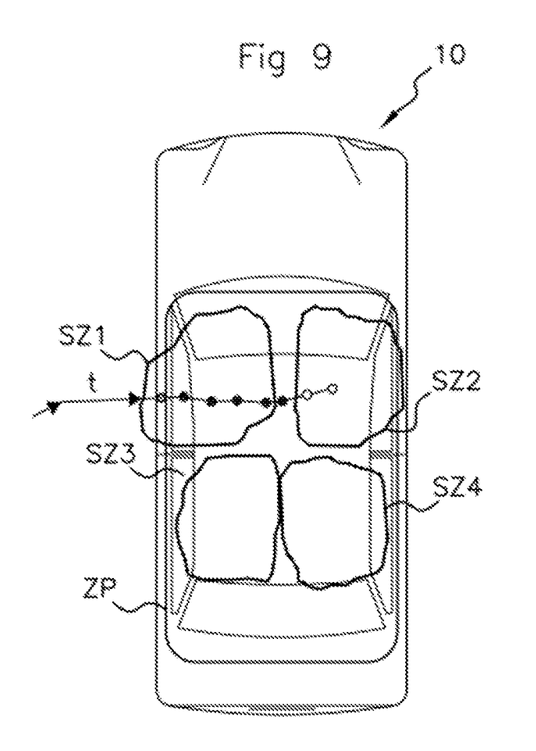
FIG. 9 schematically shows one variant of FIG. 7.

One embodiment according to the invention will now be described with reference to FIGS. 2 to 9 and to two examples (FIGS. 7 to 12). In the examples of FIGS. 7 to 9, the black dots represent the location of the user device 20 in the first sub-zone SZ1 and the white dots represent the location of the user device 20 in the second sub-zone SZ2.

Figure 3:
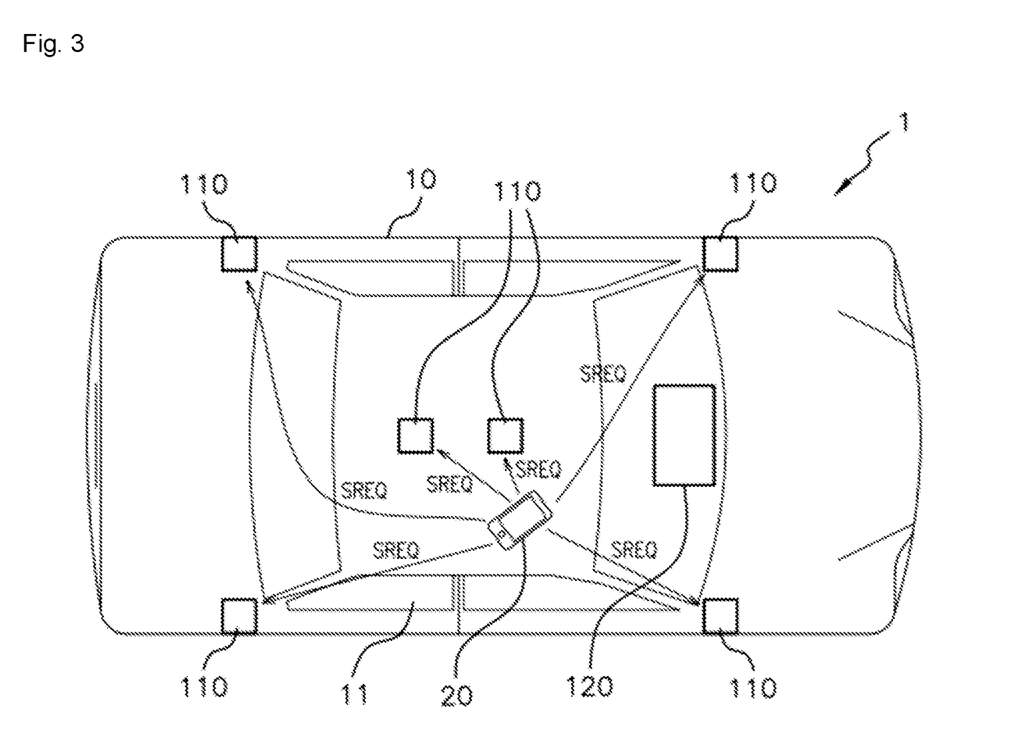
FIG. 3 schematically shows the system in a step of transmitting request signals by way of the user device, in the embodiment of FIG. 2.

It is considered a prerequisite that the user device 20 be situated in the main zone ZP. Referring to FIG. 3, the user device 20 transmits, for example periodically, a request signal SREQ comprising the identifier of said user device 20 to the transceivers 110, which receive it and transmit it to the electronic control unit 120 in a step E1.

Figure 4:
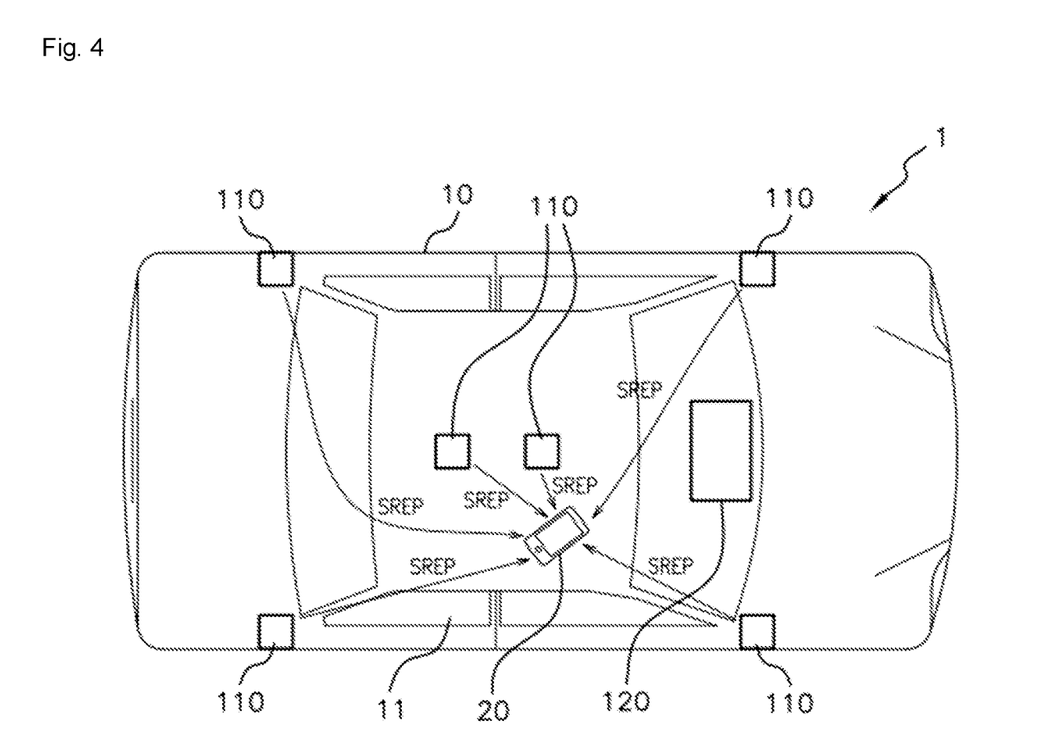
FIG. 4 schematically shows the system in a step of receiving, by way of the user device, response signals transmitted by the transceivers, in the embodiment of FIG. 2.

Referring to FIG. 4, the electronic control unit 120 commands transmission, by each of the transceivers 110 and in a staggered fashion (or successively), of a response signal SREP to the user device 20, which receives it in a step E2, said response signal SREP comprising the identifier of the transceiver 110 that transmitted it and the identifier of the user device 20 in order to prove to the user device 20 that it indeed received the request signal SREQ beforehand.

Figure 5:
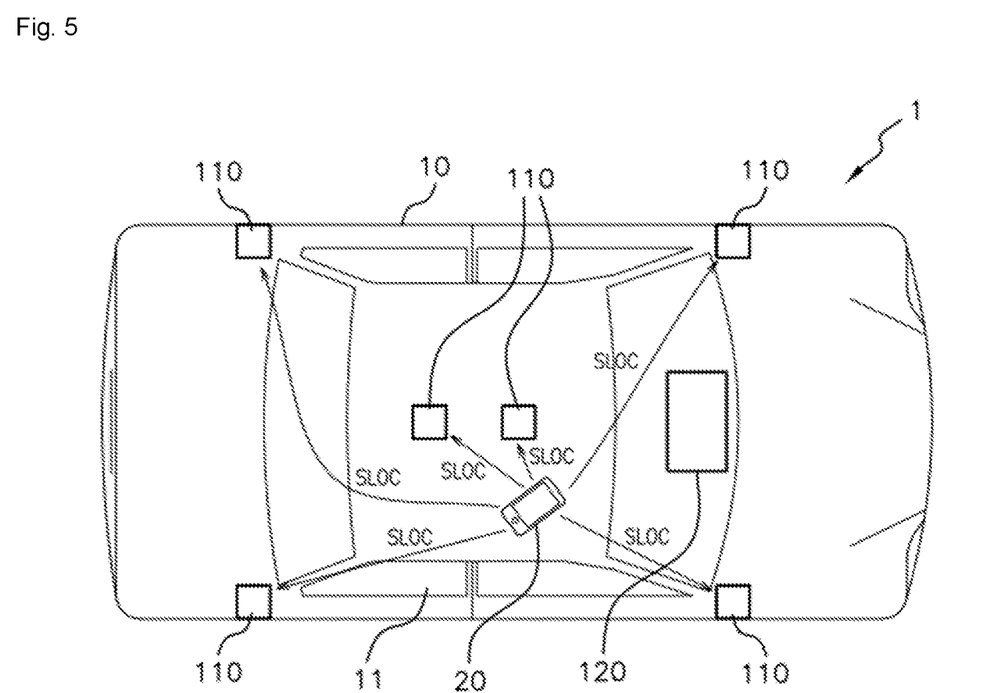
FIG. 5 schematically shows the system in a step of transmitting locating signals by way of the user device, in the embodiment of FIG. 2.

The user device 20 receives the response signals SREP sent by the transceivers 110 one after the other and then, in a step E3, transmits a location signal SLOC to each transceiver 110 as illustrated in FIG. 5, said location signal SLOC comprising the identifier of said transceiver 110. Each transceiver 110 thus receives a location signal SLOC comprising its own identifier and then transmits said location signal SLOC to the electronic control unit 120 in a step E4.

Referring to FIG. 6, the electronic control unit 120 determines, in a step E5, the distance d10, d20, d30, d40, d50, d60 of the user device 20 in relation to each of the transceivers 110 based on the location signals SLOC received by each transceiver 110, the identifier of each transceiver 110 allowing the electronic control unit 120 to associate each received location signal SLOC and therefore each determined distance d10, d20, d30, d40, d50, d60 with one, and only one, transceiver 110, for each of the transceivers 110.

The electronic control unit 120 then determines, in a step E6, the position of the user device 20 using the determined distances d10, d20, d30, d40, d50, d60, for example via triangulation or any other suitable method.

Figure 2:
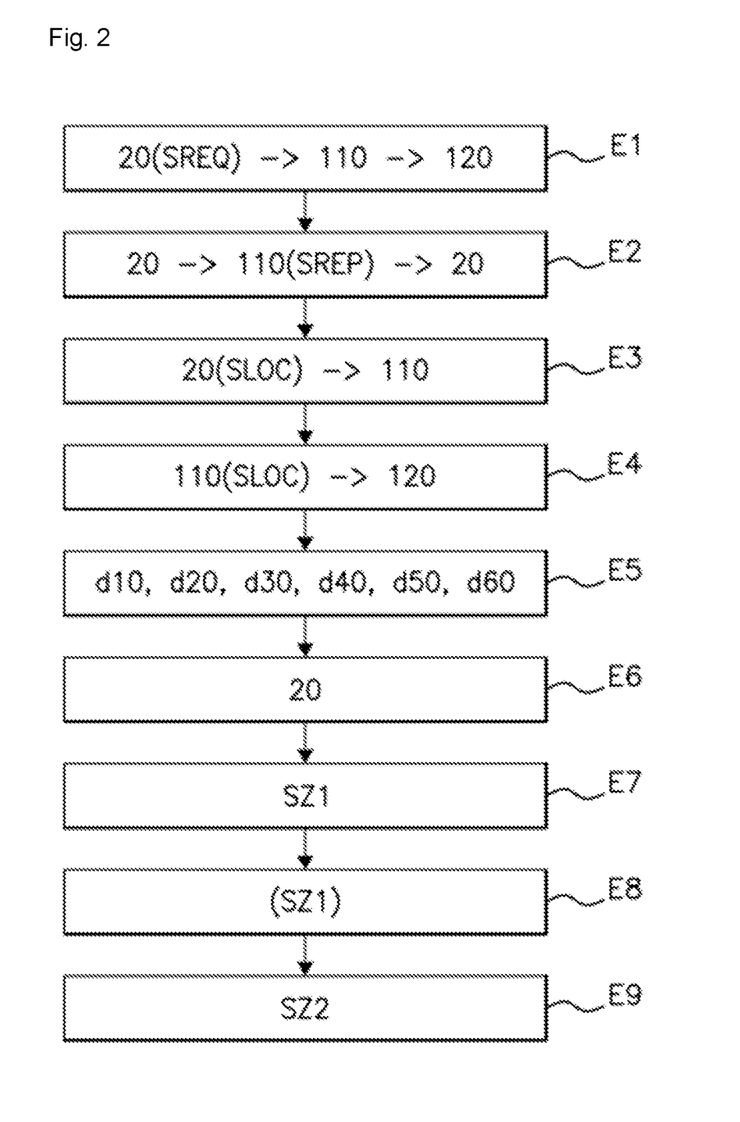
FIG. 2 schematically shows one embodiment of the method according to the invention.

Steps E1 to E6 of determining the position of the user device 20 are carried out periodically, for example every 10 or 100 ms, in order to allow the electronic control unit 120 to determine in real time the position of the user device 20.

When the position of the user device 20 is situated, for example, in the first sub-zone SZ1 (black dots in FIG. 7), the electronic control unit 20 detects the user device 20 in the first sub-zone SZ1 and then locates, in a step E7, the user device 20 in said first sub-zone SZ1. By the terms "detecting the user device 20 in a sub-zone", what is meant is determining that the position of the user device 20 lies within the perimeter delineating said sub-zone. By the terms "locating the user device 20 in a sub-zone", what is meant is that the electronic control unit 120 establishes the location status of the user device 20 as being associated with the first sub-zone SZ1.

Preferably, one or more vehicle functions associated with the first sub-zone SZ1 are triggered when the user device 20 is located in said first sub-zone SZ1. For example, when the first sub-zone SZ1 corresponds to the driver's seat, the electronic control unit 120 may make adjustments to the driver's seat or adjustments to the driver-side air-conditioning or indeed prepare for start-up of the engine of the vehicle 10 or any other suitable function.

The electronic control unit 120 keeps locating the user device 20 in the first sub-zone SZ1 for as long as the user device 20 is detected in said first sub-zone SZ1, in a step E8.

Next, in a step E9, when the user moves the user device 20 to the second sub-zone SZ2, the electronic control unit 120 detects that the user device 20 is situated in this second sub-zone SZ2 after said electronic control unit 120 determines that the position of the user device 20 lies within said second sub-zone SZ2.

The electronic control unit 120 then locates the user device 20 in the second sub-zone SZ2 when the user device 20 is solely detected in the second sub-zone and no longer in the first sub-zone SZ1 (white spots in FIG. 7). In other words, for as long as the user device 20 is still detected in the first sub-zone SZ1 and even if the electronic control unit 120 simultaneously detects the user device 20 in the second sub-zone SZ2, the electronic control unit 120 keeps locating the user device 20 in the first sub-zone SZ1 and only changes the detected location when the user device 20 is no longer detected anywhere but in the second sub-zone SZ2, in order to prevent the user device 20 from being located in two sub-zones at the same time even if they superpose partially. Likewise, when the user device 20 is between the first sub-zone SZ1 and the second sub-zone SZ2, it remains located in the first sub-zone (case of the black dot situated between the first sub-zone SZ1 and the second sub-zone SZ2 in FIG. 7).

Preferably, one or more vehicle functions associated with the second sub-zone SZ2 are triggered when the user device is located in said second sub-zone SZ2. For example, when the second sub-zone SZ2 corresponds to the front passenger seat situated beside the driver, the electronic control unit 120 may make adjustments to the front passenger seat or adjustments to the passenger-side air-conditioning or indeed adjustments to audio devices of the vehicle (vehicle audio, speakers, etc.).

In a first example (FIGS. 7 to 9), the main zone corresponds to the passenger compartment of the vehicle 10 and the sub-zones correspond to the various seats of the passenger compartment, in order for example that internal functions of the vehicle 10 that are associated with each seat may be triggered.

In the example of FIG. 7, all the sub-zones SZ1, SZ2, SZ3, SZ4 are separate and situated inside the main zone ZP. The user device 20 follows a path t through the first sub-zone SZ1 then the second sub-zone SZ2. The user device 20 is first located in the first sub-zone SZ1 (black spots) when it is physically in said first sub-zone SZ1. The user device 20 is still located in the first sub-zone SZ1 when it is physically located between the first sub-zone SZ1 and the second sub-zone SZ2 (black dot). The user device 20 is lastly located in the second sub-zone SZ2 (white spots) when it is physically in said second sub-zone SZ2 and solely in said second sub-zone SZ2.

In the example of FIG. 8, all the sub-zones SZ1, SZ2, SZ3, SZ4 are separate and situated inside the main zone ZP. However, the first sub-zone SZ1 and the second sub-zone SZ2 overlap. The user device 20 follows a path t through the first sub-zone SZ1 then the second sub-zone SZ2. The user device 20 is first located in the first sub-zone SZ1 (black spots) when it is physically in said first sub-zone SZ1. The user device 20 is still located in the first sub-zone SZ1 when it is physically located in the first sub-zone SZ1 and in the second sub-zone SZ2 (black dot in the zone of overlap). The user device 20 is lastly located in the second sub-zone SZ2 (white spots) when it is physically in said second sub-zone SZ2 and solely in said second sub-zone SZ2.

In the example of FIG. 9, all the sub-zones SZ1, SZ2, SZ3, SZ4 are separate. The first sub-zone SZ1 extends out of the vehicle 10 and therefore out of the main zone ZP. The second sub-zone SZ2, the third sub-zone SZ3 and the fourth sub-zone SZ4 are located inside the main zone ZP. The user device 20 follows a path t through the first sub-zone SZ1 then the second sub-zone SZ2. The user device 20 is first detected in the first sub-zone SZ1 but outside the main zone ZP (gray spot). In this case, the electronic control unit 120 does not locate the user device 20 in the first sub-zone SZ1. The user device 20 is still located in the first sub-zone SZ1 when it is physically located between the first sub-zone SZ1 and the second sub-zone SZ2 (black dot between the first sub-zone SZ1 and the second sub-zone SZ2). The user device 20 is lastly located in the second sub-zone SZ2 (white spots) when it is physically in said second sub-zone SZ2 and solely in said second sub-zone SZ2.

In a second example (FIGS. 10 to 12), the main zone ZP is located bordering the vehicle 10 so that the sub-zones SZ1, . . . , SZ12 may serve to locate the user of the user device 20 in the context of providing parking assistance or of personalizing welcome depending on the place in which he is found around the vehicle 10.

Figure 10:
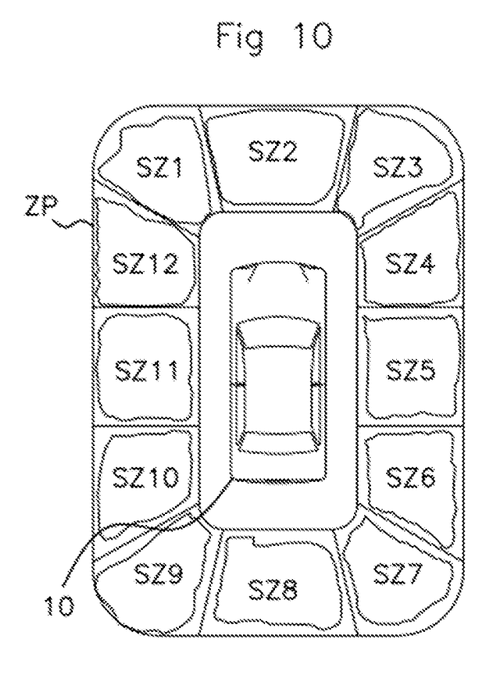
FIG. 10 schematically shows a second example of a main zone and of sub-zones.
Figure 11:
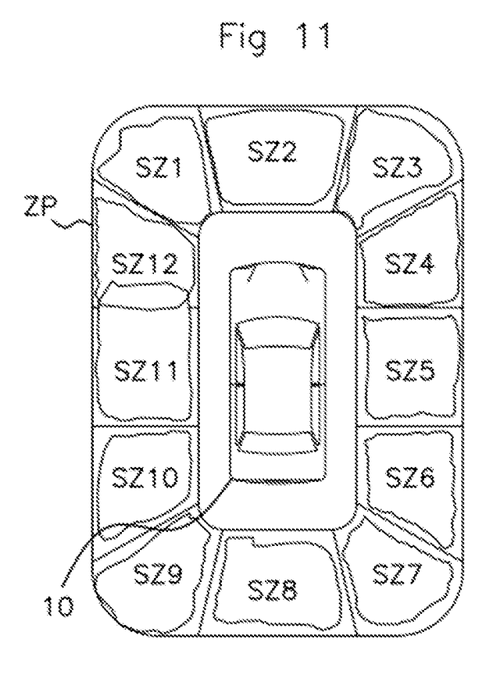
FIG. 11 schematically shows one variant of FIG. 8.
Figure 12:
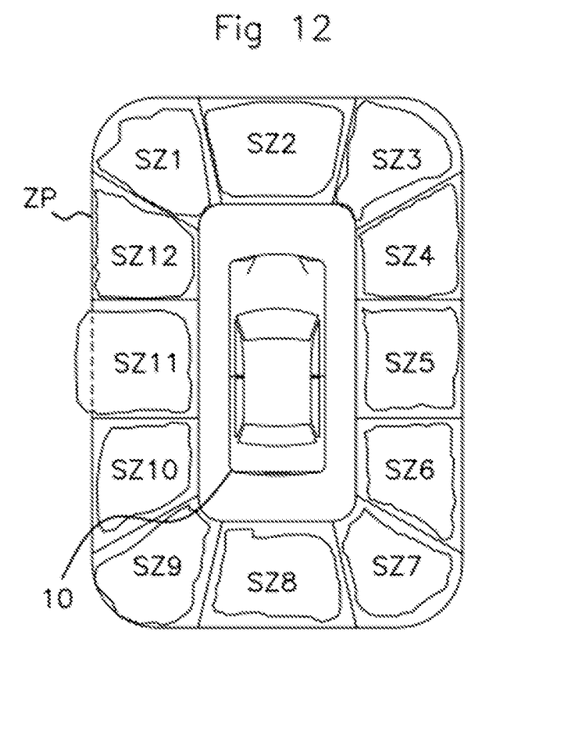
FIG. 12 schematically shows one variant of FIG. 8.

In the example of FIG. 10, the sub-zones SZ1, . . . , SZ12 are separate. In the example of FIG. 11, the eleventh sub-zone SZ11 and the twelfth sub-zone SZ12 overlap. In the example of FIG. 12, the eleventh sub-zone SZ11 extends out of the main zone ZP outside the vehicle 10.

The main zones and sub-zones used in the two examples described above, and especially their dimensions, number and arrangement, in no way limit the scope of the present invention, which may be applied with any type of main zones and sub-zones, especially in order to tailor them to the functions to be triggered.

The invention claimed is:

1. A method for locating a user device in a sub-zone of a main zone defined with respect to a vehicle, said vehicle comprising a plurality of transceivers and an electronic control unit that is configured to determine the position of the user device based on signals sent by the user device and received by the transceivers, said method comprising steps, implemented by the vehicle, of:
periodically determining the position of the user device based on signals sent by the user device and received by the transceivers;
detecting the user device in a first sub-zone;
locating the user device in said first sub-zone;
keep locating the user device in the first sub-zone for as long as the user device is detected in said first sub-zone;
detecting the user device in a second sub-zone;
when the user device is simultaneously detected in both the first sub-zone and the second sub-zone or when the user device is detected between the first sub-zone and the second sub-zone, keep locating the user equipment in the first sub-zone; and
locating the user device in said second sub-zone when the user device is detected solely in said second sub-zone.

2. The method as claimed in claim 1, wherein location of the user device in the first sub-zone causes at least a first function of the vehicle to be triggered.

3. The method as claimed in claim 1, wherein location of the user device in the second sub-zone causes at least a second function of the vehicle to be triggered.

4. The method as claimed in claim 1, wherein the main zone corresponds to the passenger compartment of the vehicle and the sub-zones correspond to different seats of the passenger compartment.

5. The method as claimed in claim 1, wherein the main zone corresponds to a peripheral zone situated around the vehicle.

6. The method as claimed in claim 5, wherein the sub-zones serve to locate the user of the user device in the context of providing parking assistance or of personalizing welcome depending on the place in which the user is found around the vehicle.

7. A non-transitory computer program product, comprising a set of program code instructions that, when executed by one or more processors, configure the one or more processors to implement a method as claimed in claim 1.

8. An electronic control unit for a motor vehicle, said vehicle comprising a plurality of transceivers, said electronic control unit being configured to:
periodically determine the position of the user device based on signals sent by the user device and received by the transceivers;
detect the user device in a first sub-zone;
locate the user device in said first sub-zone;
keep locating the user device in the first sub-zone for as long as the user device is detected in said first sub-zone;
detect the user device in a second sub-zone;
when the user device is simultaneously detected in both the first sub-zone and the second sub-zone or when the user device is detected between the first sub-zone and the second sub-zone, keep locating the user equipment in the first sub-zone; and
locate the user device in said second sub-zone when the user device is detected solely in said second sub-zone.

9. A motor vehicle comprising a plurality of transceivers and an electronic control unit as claimed in claim 8.

10. A system comprising a vehicle as claimed in claim 9 and a user device, said user device being configured to:
transmit a request signal;
receive response signals sent by the transceivers one after the other; and
transmit a location signal to each transceiver, said location signal comprising the identifier of said transceiver.

* * * * *